(12) United States Patent
Ross et al.

(10) Patent No.: US 9,126,678 B2
(45) Date of Patent: Sep. 8, 2015

(54) SPINDLE MOUNTED TILTROTOR PYLON WITH FIXED ENGINE ARRANGEMENT

(71) Applicant: Bell Helicopter Textron Inc., Fort Worth, TX (US)

(72) Inventors: Brent C. Ross, Flower Mound, TX (US); David R. Bockmiller, Fort Worth, TX (US); Mark L. Isaac, Forth Worth, TX (US); Brian J. Cox, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 168 days.

(21) Appl. No.: 13/801,674

(22) Filed: Mar. 13, 2013

(65) Prior Publication Data

US 2014/0263855 A1  Sep. 18, 2014

(51) Int. Cl.
*B64C 29/00* (2006.01)
*B64C 27/26* (2006.01)

(52) U.S. Cl.
CPC ......... *B64C 29/0033* (2013.01); *B64C 29/0075* (2013.01); *B64C 27/26* (2013.01)

(58) Field of Classification Search
CPC .. B64C 29/0033; B64C 29/007; B64C 27/37; B64D 27/06; B64D 27/12; B64D 27/18
USPC ........... 244/7 C, 12.4, 56, 7 R, 17.25, 60, 7 A
See application file for complete search history.

(56) References Cited

U.S. PATENT DOCUMENTS

| | | | |
|---|---|---|---|
| 2,814,451 A | 11/1957 | Turner et al. | |
| 2,936,697 A | 5/1960 | Dancik | |
| 2,936,968 A | 5/1960 | Mazzitelli | |
| 3,065,929 A | 11/1962 | Holland | |
| 3,259,343 A | 7/1966 | Roppell | |
| 3,284,027 A | 11/1966 | Marc | |
| 3,360,217 A | 12/1967 | Trotter | |
| 4,136,845 A | 1/1979 | Eickmann | |
| 4,142,697 A | 3/1979 | Fradenburgh | |
| 4,436,261 A | 3/1984 | Koleff | |
| 4,496,120 A | 1/1985 | Eickmann | |
| 4,783,023 A * | 11/1988 | Jupe | 244/6 |

(Continued)

FOREIGN PATENT DOCUMENTS

| | | |
|---|---|---|
| DE | 3917499 | 12/1990 |
| EP | 2484587 A1 | 8/2012 |
| GB | 1461069 A | 1/1977 |

OTHER PUBLICATIONS

Communication Pursuant to Article 94(3) EPC issued in European Application No. 13167267.7 on Sep. 4, 2014, 4 pages.
Wernicke, Kenneth, "USAAVLABS Technical Report 68-32, Tilt Prop-Rotor Composite Research Aircraft," U.S. Army Aviation Materiel Laboratories, Fort Eustis, Virgina, Nov. 1968, 490 pages.

(Continued)

*Primary Examiner* — Rob Swiatek
*Assistant Examiner* — Magdalena Topolski
(74) *Attorney, Agent, or Firm* — Fish & Richardson P.C.

(57) ABSTRACT

A rotor system for tilt rotor aircraft comprises an engine disposed at a first fixed location on a wing member; a prop-rotor pylon mechanically coupled to the engine along a drive path, and a gearbox disposed in the drive path. The prop-rotor pylon is rotatably mounted on a spindle, and the prop-rotor pylon is configured to selectively rotate about a rotational axis of the spindle between a vertical position and a horizontal position. The gearbox comprises a rotational axis aligned with the rotational axis of the spindle.

21 Claims, 8 Drawing Sheets

(56) References Cited

U.S. PATENT DOCUMENTS

| | | | |
|---|---|---|---|
| 5,085,315 | A | 2/1992 | Sambell |
| 5,645,250 | A | 7/1997 | Gevers |
| 6,260,793 | B1 | 7/2001 | Balayn et al. |
| 6,276,633 | B1 | 8/2001 | Balayn et al. |
| 6,367,736 | B1 | 4/2002 | Pancotti |
| 6,843,447 | B2 | 1/2005 | Morgan |
| 6,974,105 | B2 | 12/2005 | Pham |
| 7,584,923 | B2 | 9/2009 | Burrage |
| 7,874,513 | B1 | 1/2011 | Smith |
| 8,152,096 | B2 | 4/2012 | Smith |
| 8,251,305 | B2 | 8/2012 | Smith |
| 8,276,840 | B2 | 10/2012 | Karem |
| 8,567,709 | B2 | 10/2013 | Smith |
| 8,733,690 | B2 | 5/2014 | Bervirt et al. |
| 2004/0038768 | A1* | 2/2004 | Thomassey et al. .......... 475/221 |
| 2005/0045762 | A1 | 3/2005 | Pham |
| 2007/0102573 | A1 | 5/2007 | Goto |
| 2007/0158494 | A1 | 7/2007 | Burrage |
| 2010/0276549 | A1 | 11/2010 | Karem |
| 2010/0327123 | A1 | 12/2010 | Smith et al. |
| 2011/0114797 | A1 | 5/2011 | Karem |
| 2012/0199699 | A1 | 8/2012 | Isaac et al. |
| 2014/0034781 | A1* | 2/2014 | Kouros et al. ................... 244/60 |

OTHER PUBLICATIONS

Ross, Brent C., et al.; "Tiltrotor Aircraft with Inboard Wing Mounted Fixed Engine Arrangement;" U.S. Appl. No. 13/797,350, filed Mar. 12, 2013.

European Search Report issued in European Application No. 13167268.5 on Sep. 29, 2014; 3 pages.

"Bell-X22A: Analysis of a VTOL research vehicle", Flight International, Mar. 23, 1967, p. 445-449.

Office action issued in U.S. Appl. No. 13/797,350 on Oct. 9, 2014, 12 pages.

Foreign Communication From a Counterpart Application, Application No. 13167267.7, European Search Report dated Dec. 5, 2013, 4 pages.

Foreign Communication From a Counterpart Application, Application No. 13167267.7, Communication Pursuant to Article 94(3) EPC dated Dec. 19, 2013, 5 pages.

Communication Pursuant to Article 94(3) EPC issued in European Application No. 13167268.5 on Jan. 8, 2015; 6 pages.

"Bell Boeing V-22 Osprey", Wikipedia, Mar. 10, 2012, available at: http://en.wikipedia.org/w/index.php?title=Bell_Boeing_V-22_Osprey&oldid=481213505Bell Boeing V-22 Osprey.

Office action issued in U.S. Appl. No. 13/797,350 on Jan. 2, 2015, 16 pages.

* cited by examiner

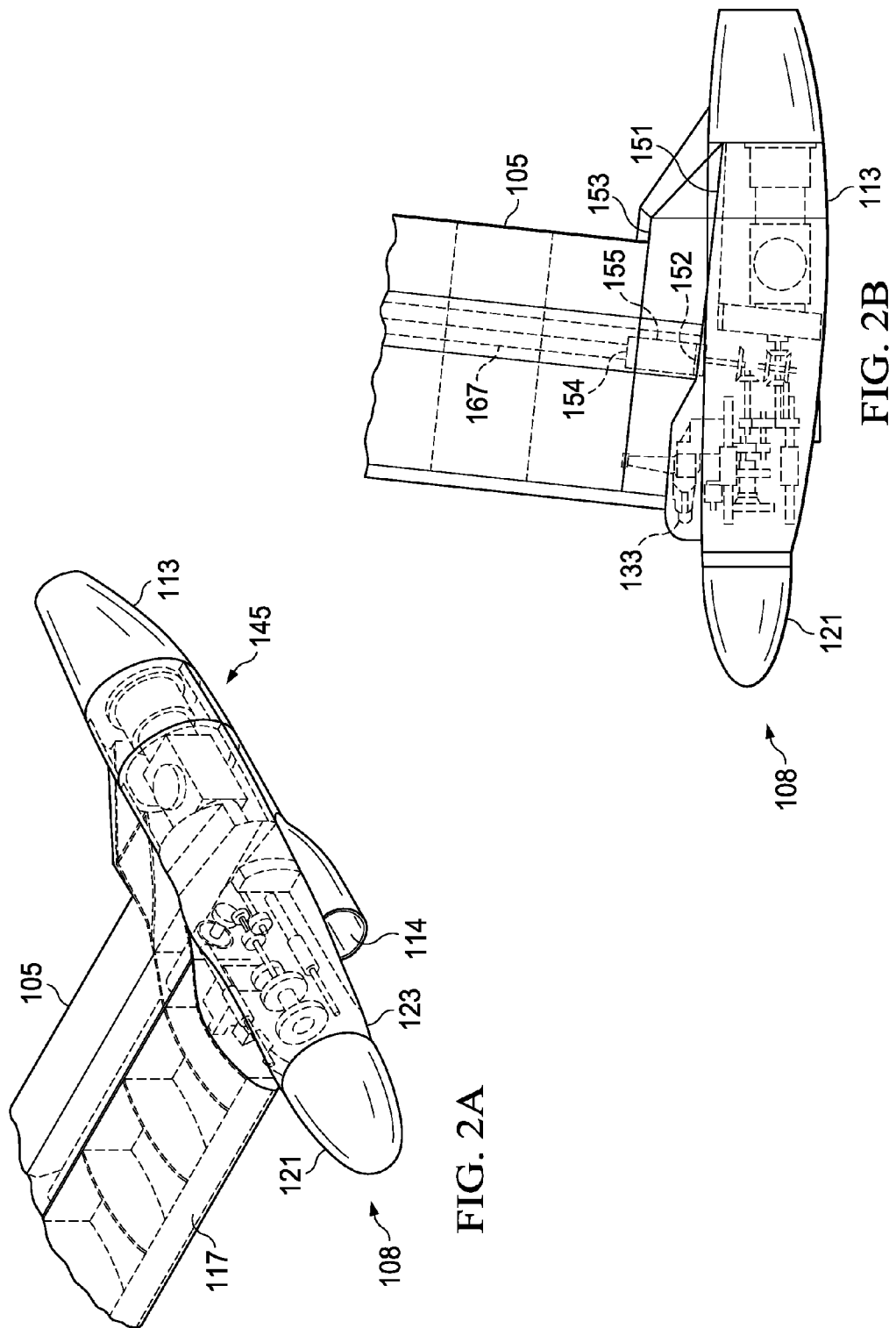

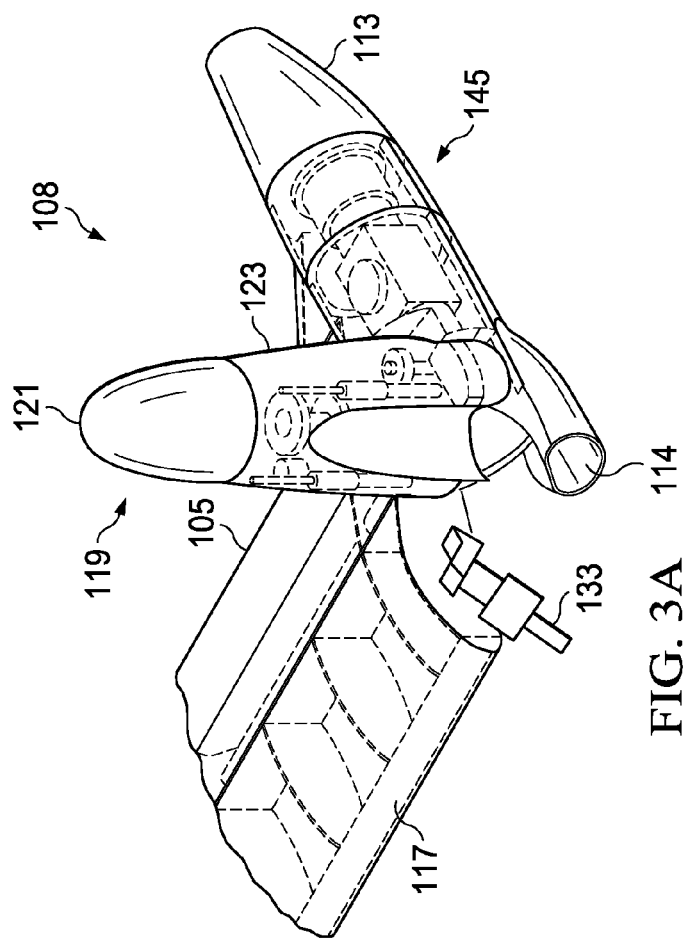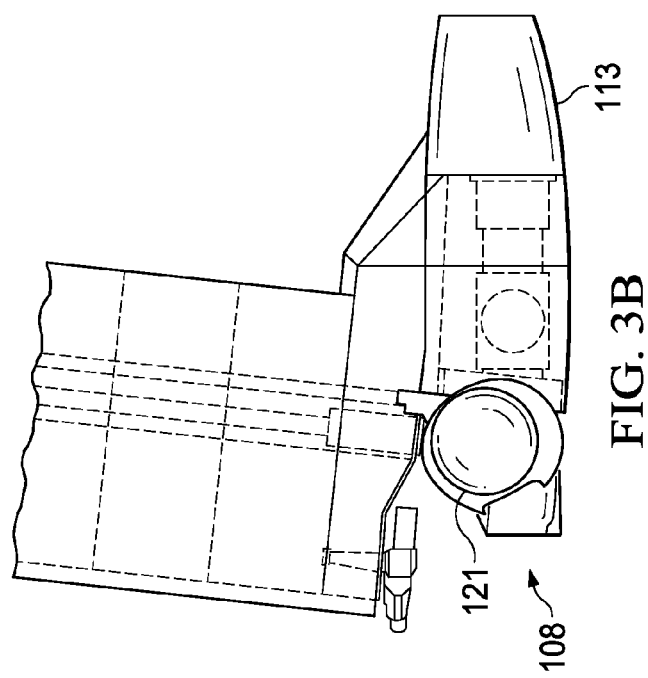

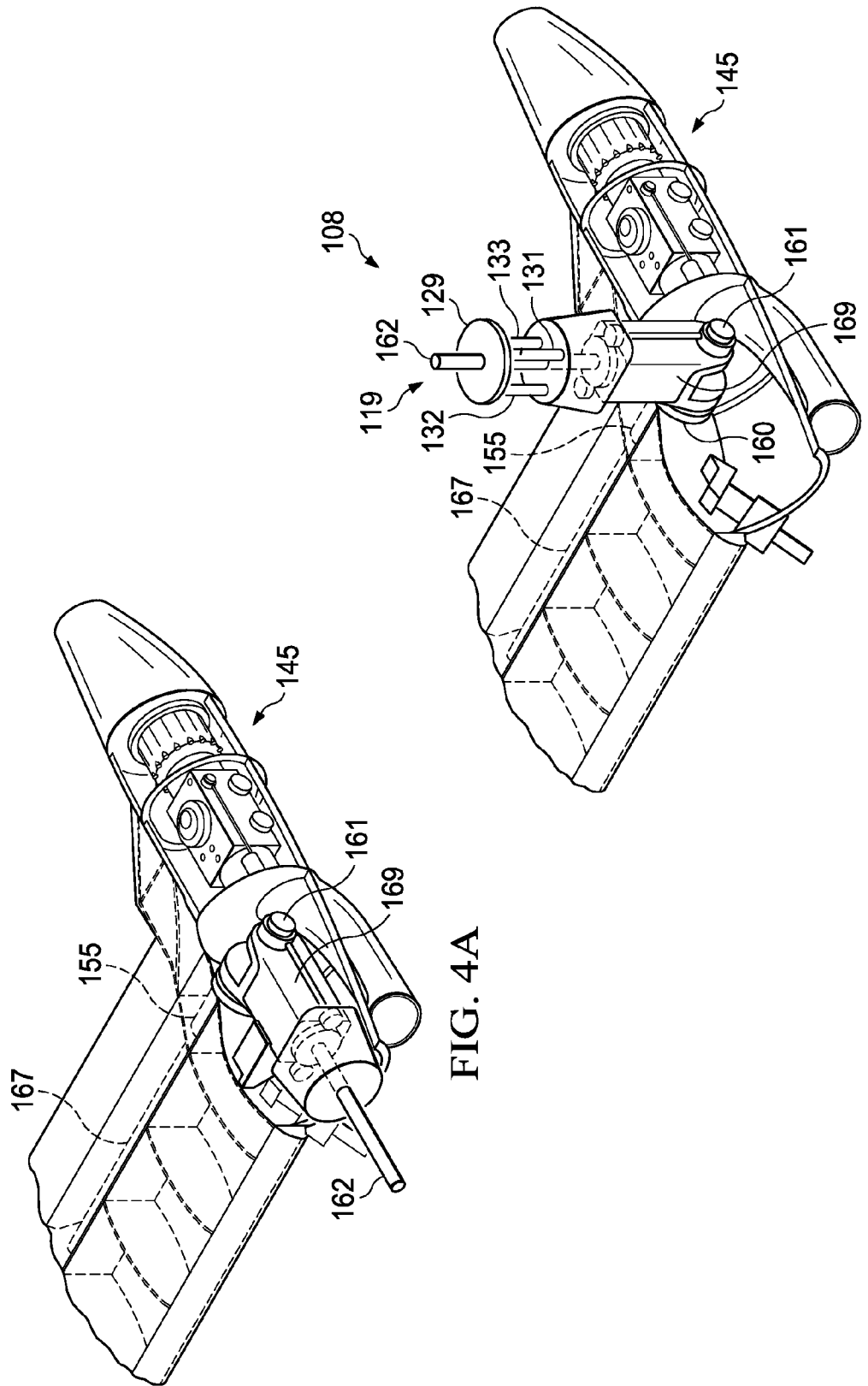

SPINDLE MOUNTED TILTROTOR PYLON WITH FIXED ENGINE ARRANGEMENT

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A tilt rotor aircraft can have wing mounted rotatable nacelles where the nacelles include an engine and rotor hub in a fixed position relative to each other. The nacelles can be selectively rotated between a helicopter mode and an airplane mode. In the helicopter mode, the nacelles can be rotated to an approximate vertical position so that the tilt rotor aircraft can hover similar to a conventional helicopter. In the airplane mode, the nacelles can be rotated to an approximate horizontal position so that the tilt rotor aircraft can fly similar to a fixed wing aircraft. Since the engine rotates along with the rotor hub, the engine must be capable of operating not only in a horizontal orientation, but also a vertical orientation. The ability to operate in a vertical orientation can limit the engine options available for use as well as increasing the certification, testing, and maintenance requirements for the available engines. Further, a rotating engine typically limits maintenance/inspection access around the engine to allow support of the rotating nacelle fairing and firewalls.

SUMMARY

In an embodiment, a rotor system for tilt rotor aircraft comprises an engine disposed at a first fixed location on a wing member; a prop-rotor pylon mechanically coupled to the engine along a drive path, and a gearbox disposed in the drive path. The prop-rotor pylon is rotatably mounted on a spindle, and the prop-rotor pylon is configured to selectively rotate about a rotational axis of the spindle between a vertical position and a horizontal position. The gearbox comprises a rotational axis aligned with the rotational axis of the spindle.

In an embodiment, a rotor system for tilt rotor aircraft comprises an engine disposed at a first fixed location on a wing member, an interconnect drive shaft passing through the wing member, a prop-rotor pylon mechanically coupled to the engine along a first drive path and the interconnect drive shaft along a second drive path, a spindle, a first gearbox disposed in the first drive path, and a second gearbox disposed in the second drive path. The prop-rotor pylon is rotatably mounted on the spindle, and the prop-rotor pylon is configured to selectively rotate about a rotational axis of the spindle between a vertical position and a horizontal position. The first gearbox comprises a rotational axis aligned with the rotational axis of the spindle, and the second gearbox comprises a rotational axis aligned with the rotational axis of the spindle.

In an embodiment, an aircraft comprises a fuselage, a wing member, an engine disposed at a first fixed location on the wing member, a prop-rotor pylon mechanically coupled to the engine along a first drive path, and a first gearbox comprising a first spiral bevel gearset disposed in the first drive path. The prop-rotor pylon is configured to selectively rotate about a rotational axis between a vertical position and a horizontal position, and the first spiral bevel gearset comprises a rotational axis aligned with the rotational axis of the prop-rotor pylon.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description:

FIG. 2A is a perspective, partial cut-away view of a prop-rotor pylon in an airplane mode according to an embodiment.

FIG. 2B is a plan, partial cut-away view of a prop-rotor pylon in an airplane mode according to an embodiment.

FIG. 3A is a perspective, partial cut-away view of a prop-rotor pylon in a helicopter mode according to an embodiment.

FIG. 3B is a plan, partial cut-away view of a prop-rotor pylon in a helicopter mode according to an embodiment.

FIG. 4A is a perspective, partial cut-away view of a spindle mounting for a prop-rotor pylon in an airplane mode according to an embodiment.

FIG. 4B is a perspective, partial cut-away view of a spindle mounting for a prop-rotor pylon in a helicopter mode according to an embodiment.

DETAILED DESCRIPTION OF THE EMBODIMENTS

Figure 1:
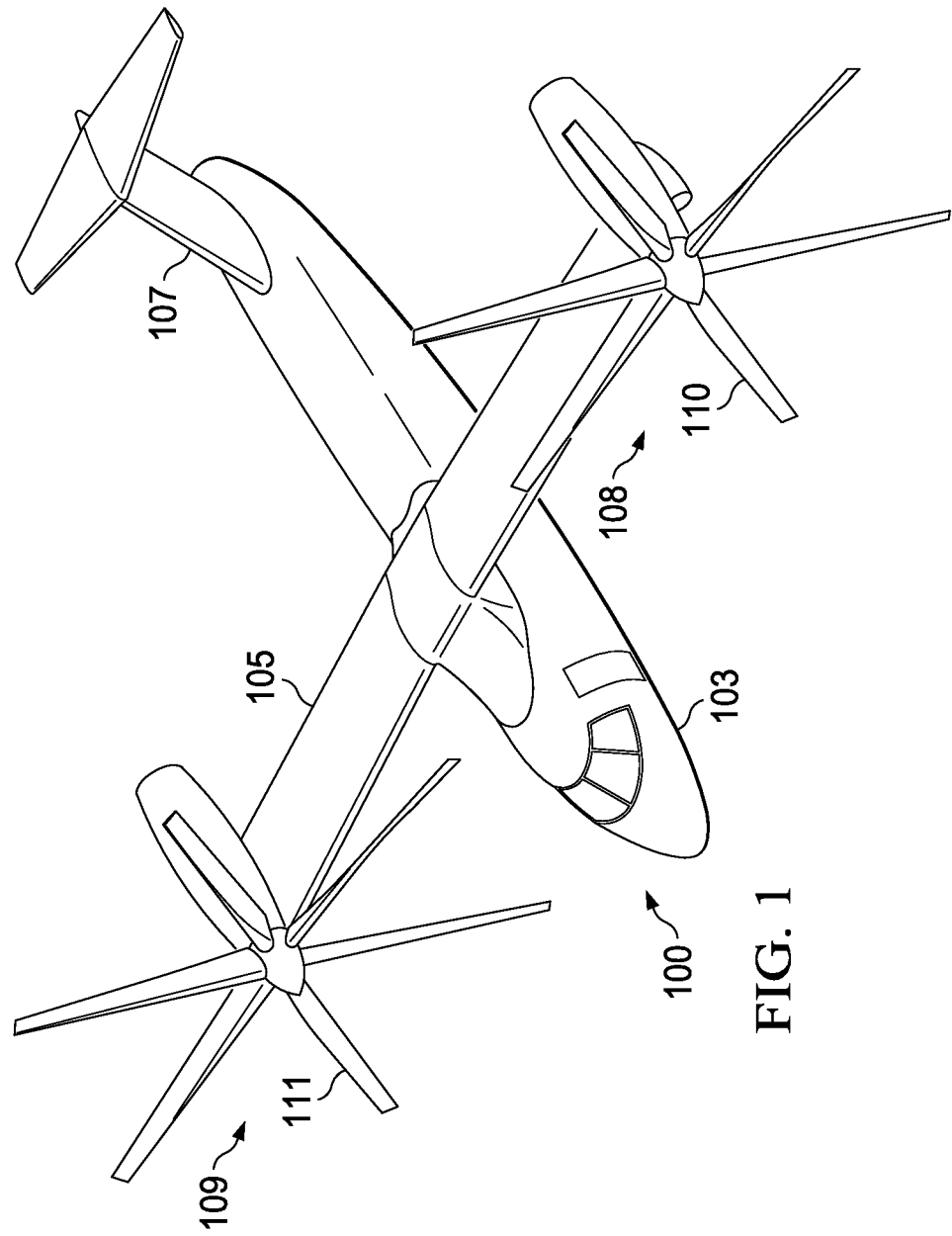
FIG. 1 is a perspective view of a tiltrotor aircraft according to an embodiment.

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results. It should also be recognized that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Unless otherwise specified, use of the terms "connect," "engage," "couple," "attach," or any other like term describing an interaction between elements is not meant to limit the interaction to direct interaction between the elements and may also include indirect interaction between the elements described. In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application includes an engine and pylon arrangement for a tilt rotor aircraft in which the engine is fixed in relation to a wing portion of the aircraft, while the pylon is rotatable about a spindle. The pylon supports a rotor hub having a plurality of rotor blades. Rotation of the pylon allows the aircraft to selectively fly in a helicopter mode and an airplane mode, as well as at any position therebetween. The engine may be coupled to the rotor hub through a series of gears. The gearing arrangement may be such that the axis of rotation of the pylon about the spindle is aligned with an axis of rotation of a gearbox between the engine and the rotor hub. A separate interconnect drive shaft may also be mechanically coupled to the rotor hub, and the interconnect drive shaft may similarly be coupled to a gearbox having an axis of rotation aligned with the axis of rotation of the pylon about the spindle. Further, the drive paths from the engine to the prop-rotor gearbox in the prop-rotor pylon and from the interconnect drive shaft to the prop-rotor gearbox may each be independent, thereby providing for an added level of safety and redundancy in providing power to the rotor hub.

Referring to FIG. 1, a tilt rotor aircraft 100 is illustrated. In an embodiment, a tilt rotor aircraft 100 comprises a fuselage 103, a wing member 105, and a tail member 107. While described as a single wing member 105, it is to be understood that the wing member may be formed from separate components such that two or more wing members are coupled to the fuselage 103 (e.g., each side of the fuselage may comprise a separate wing member). The aircraft 100 may also include a first rotor system 108 and a second rotor system 109. The first rotor system 108 is located on an end portion of a first side of the wing member 105, while second rotor system 109 is located an end portion of a second side of the wing member 105. The first rotor system 108 and second rotor system 109 are substantially symmetric of each other about the fuselage 103. The first rotor system 108 and the second rotor system 109 each include a plurality of rotor blades 110 and 111 coupled to a rotor hub, respectively. In the interest of clarity, only the first rotor system 108 will be discussed in detail in the following description. However, it should be understood that the form and function of the second rotor system 109 can be fully understood from the description of the first rotor system 108 described herein. Also in the interest of clarity, the rotor blades 110 and 111 are omitted from some drawing views described below.

While FIG. 1 illustrates the rotor systems 108, 109 in the context of a tilt-rotor aircraft, it should be understood that the first rotor system 108 and the second rotor system 109 can be implemented on other tilt rotor aircraft. For example, an alternative embodiment may include a quad tilt rotor aircraft that has an additional wing member located aft of wing member 105, the additional wing member can have additional rotor systems similar to first rotor system 108 and the second rotor system 109. In some embodiments, the rotor systems 108, 109 can be used with an unmanned version of a tilt rotor aircraft 100. Further, the first rotor system 108 and/or the second rotor system 109 can be integrated into a variety of tilt rotor aircraft configurations.

Referring now to FIGS. 2A, 2B, 3A, and 3B, the rotor system 108 is illustrated in an airplane mode and a helicopter mode. The rotor system 108 includes a fixed engine nacelle 113 located in-line with a prop-rotor pylon 119 or outboard of the prop-rotor pylon 119. Positioning the engine and engine nacelle 113 in-line with the prop-rotor pylon 119 may reduce the drag created by the engine nacelle 113 while allowing for alignment of the drive path between the engine and the prop-rotor pylon 119. In an embodiment, the engine and engine nacelle 113 may be located slightly outboard of the prop-rotor pylon 119 to allow for the engine drive shaft to align with the drive path along the outboard side of the prop-rotor pylon 119, as described in more detail herein. One or more ribs of the wing member 105 may support the engine 145 and/or prop-rotor pylon 119. In the embodiment, the two outboard ribs 151, 153 of the wing 105 may extend rearward to provide a support for the engine 145 and engine nacelle 113. The prop-rotor pylon 119 includes rotor mast coupled to a plurality of rotor blades (e.g., rotor blades 111 as shown in FIG. 1) coupled to an internal rotor structure located within an aerodynamic spinner fairing 121. The prop-rotor pylon 119 includes a pylon fairing or transmission fairing 123 that is configured to rotate along with the rotatable prop-rotor pylon 119.

The prop-rotor pylon 119 is rotatable between the airplane mode, in which prop-rotor pylon 119 is positioned approximately horizontal (as shown in FIGS. 2A and 2B), and a helicopter mode (as shown in FIGS. 3A and 3B), in which prop-rotor pylon 119 is positioned approximately vertical. In the airplane mode, vertical lift is primarily supplied by the airfoil profile of wing member 105, while the rotor blades in each prop-rotor pylon 119 provide forward thrust. In the helicopter mode, vertical lift is primarily supplied by the thrust of the rotor blades in each prop-rotor pylon 119. It should be appreciated that the tilt rotor aircraft 100 may be operated such that prop-rotor pylons 119 are selectively positioned between airplane mode and helicopter mode, which can be referred to as a conversion mode.

In an embodiment, a conversion actuator 133 may be used to selectively rotate the prop-rotor pylon 119 between the vertical position (e.g., the helicopter mode) and the horizontal position (e.g., the airplane mode), while the engine 145 remains fixed on the wing member 105. In an embodiment, the conversion actuator 133 may comprise any of a variety of configurations with the exact actuator type being implementation specific. In an embodiment, the conversion actuator 133 may include, but is not limited to, a linear actuator, a rotary actuator, or the like.

In an embodiment, the rotor system can comprise a prop-rotor down-stop and/or a prop-rotor up-stop for engaging and retaining the prop-rotor in the airplane mode or helicopter mode, respectively. The down-stop and/or up-stop may be useful in retaining the prop-rotor pylon in position while relieving stresses on the rotational components and/or the actuator(s), such as the conversion actuator 133.

The fixed engine nacelle 113 includes an engine air inlet 114, which may be positioned aft of a leading edge portion 117 of wing member 105 and below the surface of the wing member 105. In some embodiments, the air inlet 114 may be positioned forward of leading edge portion 117 of wing member 105, and/or the air inlet may be positioned above the wing member 105. The exact position of air inlet 114 is implementation specific and may depend, at least in part, upon the aerodynamic ram air effects that can be achieved through selective placement and/or any frontal surface air drag effects for the aircraft.

While illustrated as being located at the wing tip, it should be appreciated that the wing tip portion of wing member 105 can be lengthened to customize an aspect ratio of wing member 105 in accordance with implementation specific requirements (e.g., aerodynamic lift requirements). As such, it should be understood that even though fixed engine nacelle 113 is illustrated approximately abutting the wing tip portion of wing member 105, in some embodiments, the fixed engine nacelle 113 may include the wing tip portion extending beyond the fixed engine nacelle 113.

The prop-rotor pylon 119 can be mounted on and rotate about a spindle 155. The spindle 155 may generally comprise a support element that is rotatably coupled to the wing member 105 and configured to allow the prop-rotor pylon to selectively rotate between the helicopter mode and the airplane mode. In an embodiment, the spindle 155 is disposed through and engages the ribs 151, 153, which may comprise rotational bearings 152, 154. The bearings 152, 154 may generally be configured to allow the spindle to rotate with the prop-rotor pylon 119 in response to an actuation force provided by the conversion actuator 133. In an embodiment, the spindle 155 is coupled to the wing member 105 through the ribs 151, 153 on a single side of the prop-rotor pylon 119 such that the prop-rotor pylon 119 is not disposed between two adjacent ribs and/or does not engage ribs on both sides of the prop-rotor pylon 119. This configuration may allow the prop-rotor pylon 119 and engine 145 to be located at the tip of the wing member 105 without requiring any additional ribs or support beams disposed outboard of the prop-rotor pylon 119.

As shown in FIGS. 4A and 4B, the engine 145 is mechanically coupled to the rotor mast 162 along a drive path comprising a gearbox 161 coupled to a driveshaft from the engine 145 and a prop-rotor gearbox 169 coupled to the gearbox 161. The drive path provides a transfer of torque from the engine 145 to the rotor mast 162 through the gearbox 161 and a prop-rotor gearbox 169. The gearbox 161 may be disposed on the outboard side of the prop-rotor pylon 119. Similarly, an interconnect drive shaft 167 is mechanically coupled to the rotor mast 162 along a second drive path comprising a second gearbox 160 and the prop-rotor gearbox 169. The second drive path may also provide a transfer of torque between the interconnect drive shaft 167 and the rotor mast 162, or between the rotor mast 162 gearing and the interconnect drive shaft 167. The second gearbox 160 may be disposed on the inboard side of the prop-rotor pylon 119 to allow the interconnect drive shaft 167 to pass through the wing and allow a transfer of power to another prop-rotor pylon located on the wing member 105 (e.g., a prop-rotor pylon located on an opposite side of the fuselage).

The prop-rotor pylon 119 may rotate about a rotational axis of the spindle 155. In order to allow torque to be transferred to the rotor mast 162 as the prop-rotor pylon 119 selectively rotates, a rotational axis of the gearbox 161 and the second gearbox 160 may be aligned with the rotational axis of the spindle 155. The gearbox 161 may be coupled to the spindle 155 at an outboard end of the spindle 155 to maintain the alignment of the rotational axis of the gearbox 161 with the rotational axis of the spindle 155 as the prop-rotor pylon 119 rotates. The engine 145 may be aligned with the prop-rotor pylon 119 such that the drive shaft from the engine 145 is aligned with the gearbox 161. Similarly, the second gearbox 160 may be coupled to the spindle 155 on the inboard side of the prop-rotor pylon 119. In order to allow the second gearbox 160 to be located co-axially with the spindle 155, the interconnect drive shaft may pass through the center of the spindle 155, and the second gearbox 160 may be located in-line with the spindle 155.

The rotor blades coupled to the prop-rotor mast 162 may be operated using any available control system. In an embodiment, the rotor system 108 may be operated and controlled using a swashplate coupled to one or more actuators to allow the prop-rotor system 108 to operate in airplane mode or helicopter mode. The swashplate 129 can be coupled to the rotor blades via a plurality of pitch links. A plurality of swashplate actuators 131, 132, 133 are configured to selectively actuate the swashplate 129, thereby selectively changing the pitch of the rotor blades 111 so as to affect thrust, lift, and direction of the aircraft 100 during operation. For example, the swashplate 129 can be selectively tilted to effect a cyclic pitch change of the rotor blades 111 such as during the helicopter mode. In addition, the swashplate 129 can be linearly actuated to effect a collective pitch change of the rotor blades 111 such as during helicopter and/or airplane mode. The control system may be located on the prop-rotor pylon 119 and rotate with the prop-rotor pylon 119 during use. In some embodiments, the control system may receive power and/or hydraulic inputs from one or more accessory input drives, which are discussed in more detail herein.

Figure 5A:
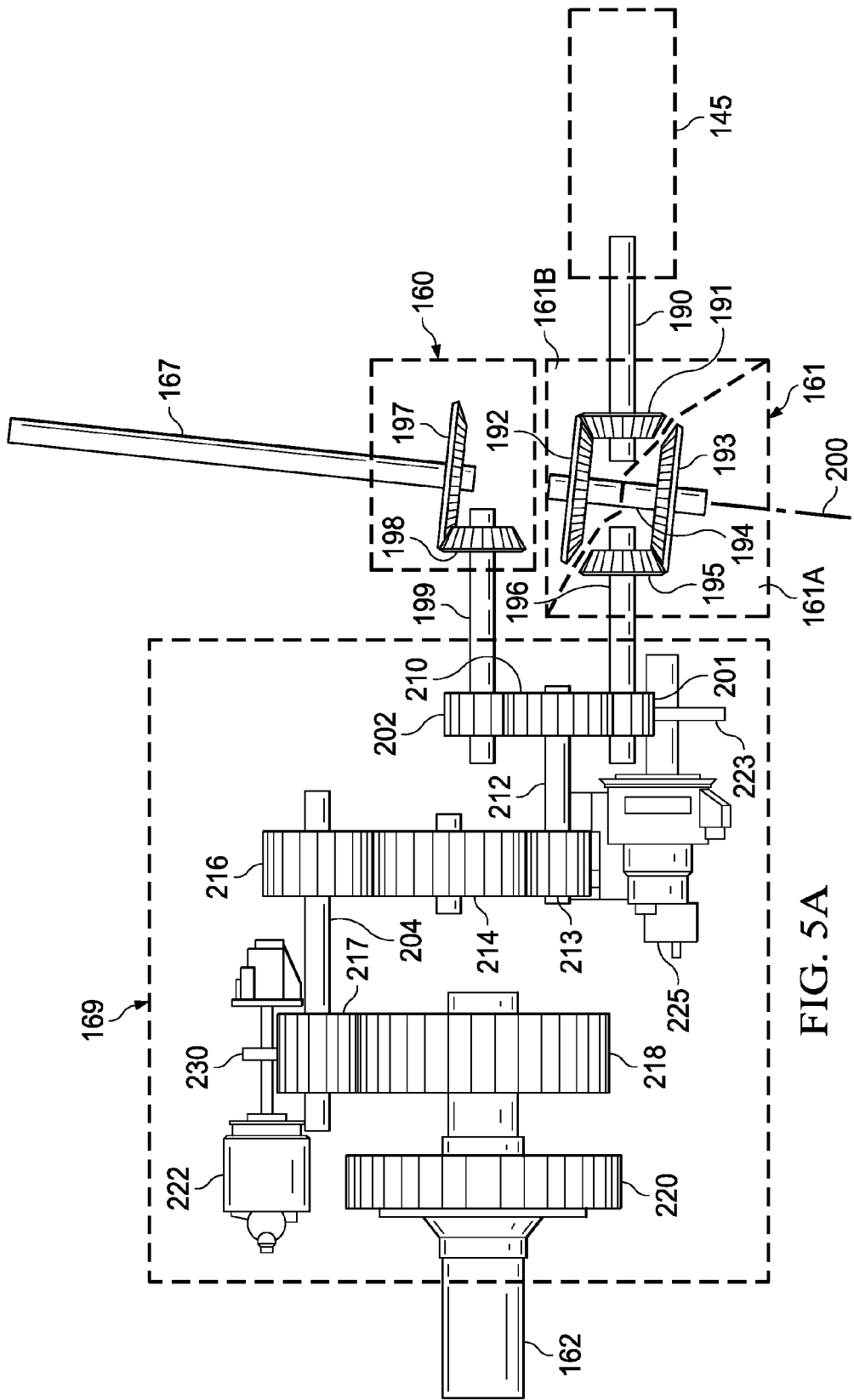
FIG. 5A is a schematic view of a gearing arrangement according to an embodiment.

An embodiment of a gearing configuration of the prop-rotor pylon is schematically illustrated in FIG. 5A. In this embodiment, the drive shaft 190 from the engine 145 passes to the gearbox 161. Within the gearbox 161, the drive shaft 190 is coupled to a conical input gear 191, which engages a conical output gear 192. The output gear 192 is coupled to a shaft 194 and a second conical input gear 193 in gearbox 161. The second input gear 193 may engage a second conical output gear 195, which may be coupled to a shaft 196. The input gears 191, 193 and/or output gears 192, 195 may have straight teeth or helical teeth (e.g., helical gears). In an embodiment, the input gears 191, 193 and the output gears 192, 195 may form a spiral bevel gearset having an axis of rotation aligned with the longitudinal axis of the shaft 194, which may align with the axis of rotation of the spindle (e.g., spindle 155 of FIG. 2B). The shaft 196 may pass from the gearbox 161 to the prop-rotor gearbox 169. The coupling of the drive shaft 190 with the engine 145 and the gearbox 161 in addition to the shaft 196 passing from the gearbox 161 to the prop-rotor gearbox 169 may provide a first drive path between the engine 145 and the prop-rotor gearbox 169. In an embodiment, the gearbox 161 can be composed of two sub-housings or sub-elements 161A, 161B that may be separate housings used to maintain a seal for lubrication. The first sub-element 161A may be configured to rotate with the prop-rotor gearbox 169, and the second sub-element 161B may be fixed with respect to the engine 145. The sub-elements 161A, 161B may allow the conical output gear 195 in sub-element 161A to rotate in an arc about the second conical input gear 193 and the conversion axis 200 while maintaining a seal to the lubricating fluid in each sub-element 161A, 161B.

Similarly, the interconnect drive shaft 167 passes to the gearbox 160. Within the gearbox 160, the interconnect drive shaft 167 is coupled to a conical input gear 197, which engages a conical output gear 198. The output gear 198 is coupled to a shaft 199, which may pass out of the second gearbox 160 and couple to the prop-rotor gearbox 169. The input gear 197 and/or the output gear 198 may have straight or helical teeth. In an embodiment, the input gear 197 and the output gear 198 may form a spiral bevel gearset having an axis of rotation aligned with the longitudinal axis of the interconnect drive shaft 167. The axis of rotation of the interconnect drive shaft 167 may align with the axis of rotation of the spindle and the axis of rotation of the shaft 194 in the gearbox 161 (e.g., in sub-elements 161A, 161B). This alignment may allow the prop-rotor pylon to rotate about the axis of rotation of the spindle while maintaining a mechanical coupling through the gearbox 161 (e.g., sub-elements 161A, 161B) and the second gearbox 160. Further, the coupling of the interconnect drive shaft 167 with the second gearbox 160 in addition to the shaft 199 passing from the second gearbox 160 to the prop-rotor gearbox 169 may provide a second drive path between the interconnect drive shaft 167 and the prop-rotor gearbox 169 that is independent of the first drive path between the engine 145 and the prop-rotor gearbox 169.

The shaft 196 from the gearbox 161 and the shaft 199 from the second gearbox 160 may both pass to the prop-rotor gearbox 169. In general, the prop-rotor gearbox is configured to convert the torque from the engine 145 and the interconnect drive shaft 167 to a reduced speed suitable for the rotor mast 162. The prop-rotor gearbox 169 may comprise various reduction gearing configurations such as one or more planetary gearsets, one or more helical gearsets, or the like arranged in one or more speed reduction stages and mechanically coupled to the prop-rotor mast 162.

As illustrated in FIG. 5A, the prop-rotor gearbox 169 may generally comprise a pair of cylindrical gears 201, 202 coupled to the shafts 196, 199, respectively. The cylindrical gears 201, 202 may both engage a single cylindrical gear 210. The gears 201, 202, and/or 210 may have straight or helical teeth configured to mesh with each other. The gear 210 may serve as a reduction gear stage. The gear 210 may be coupled to a cylindrical gear 213, which may have a smaller diameter than gear 210, through a shaft 212. The cylindrical gear 213 may mesh with cylindrical gear 214, which in turn may mesh with cylindrical gear 216. Each of the gears 213, 214, and/or 216 may have straight or helical teeth. The gear 216 may be coupled to a cylindrical gear 217, which may have a smaller diameter than gear 216, through a shaft 204. The cylindrical gear 217 may mesh with a larger diameter cylindrical gear 218 in an intermediate reduction stage. The gear 217 and/or 218 may have straight or helical teeth. The gear 218 may be coaxially coupled to a speed reduction gear 220, which may be coupled to the prop-rotor mast 162. Gear 220 may be a planetary gear comprising a final reduction stage in the prop-rotor gearbox 169. The planetary gear may be of the general epicyclic type and provide a high reduction ratio in a relatively small volume. The prop-rotor mast 162 may then be coupled to a rotor hub and the plurality of rotor blades for use in operating the aircraft.

One or more accessory input drives may be optionally coupled to the drive path within the prop-rotor gearbox. The accessory input drives may be used to drive auxiliary equipment such as one or more pumps (e.g., a hydraulic pump, a coolant pump, etc.), blowers, electrical generators, and the like. Each accessory input drive may be located and mesh with a gear at a suitable reduction stage to provide the appropriate input speed to the accessory, while also taking into account space considerations within the prop-rotor pylon 119 and prop-rotor gearbox 169. As illustrated in FIG. 5A, the accessory input drives may comprise one or more gears that mesh with one or more gears in the drive path. For example, auxiliary input gear 230 may mesh with cylindrical gear 217. The auxiliary input gear 230 may be coupled to an auxiliary component 222. Similarly, auxiliary input gears 223 and 225 may engage cylindrical gears 201 and 213 respectively. In some embodiments, the auxiliary input drives may be located at a location on the drive path that is not on the prop-rotor pylon. For example, one or more accessory input drives may engage the interconnect drive shaft 167 along its length, such as within the fuselage. Additional auxiliary input drives may be used as needed to provide the appropriate power to any suitable auxiliary components.

The prop-rotor gearbox 169 may comprise additional gear reduction schemes. In an embodiment illustrated in FIG. 5B, the prop-rotor gearbox 169 may comprise a plurality of planetary gear reduction stages. In this embodiment, the inputs from the engine 145 and the interconnect drive shaft 167 through the gearbox 161 and the second gear box 160, respectively, may be the same or similar to embodiment described with respect to FIG. 5A, and in the interest of clarity, these components will not be described further. In this embodiment, the cylindrical gears 201, 202 may mesh with a cylindrical gear 251. Each of the gears 201, 202, and/or 251 may have straight or helical teeth. The cylindrical gear 251 may be coupled by a shaft to two stages of reduction provided by two planetary gearsets, which may be coaxial with each other and/or the cylindrical gear 251. The first planetary gearset 253 may comprise an intermediate reduction stage for accepting a high speed input from the cylindrical gear 251 and reducing the speed to the second planetary gearset 255. The second planetary gearset 255 may comprise a final reduction stage to reduce the input speed to a suitable speed for the prop-rotor mast 162. The prop-rotor mast 162 may then be coupled to the rotor hub and the plurality of rotor blades for use in operating the aircraft. Various additional combinations of cylindrical gears (e.g., helical gearsets), planetary gears, and the like may be used to reduce the input speed from the engine 145 and/or the interconnect drive shaft 167 to a suitable speed for the prop-rotor mast.

Figure 5B:
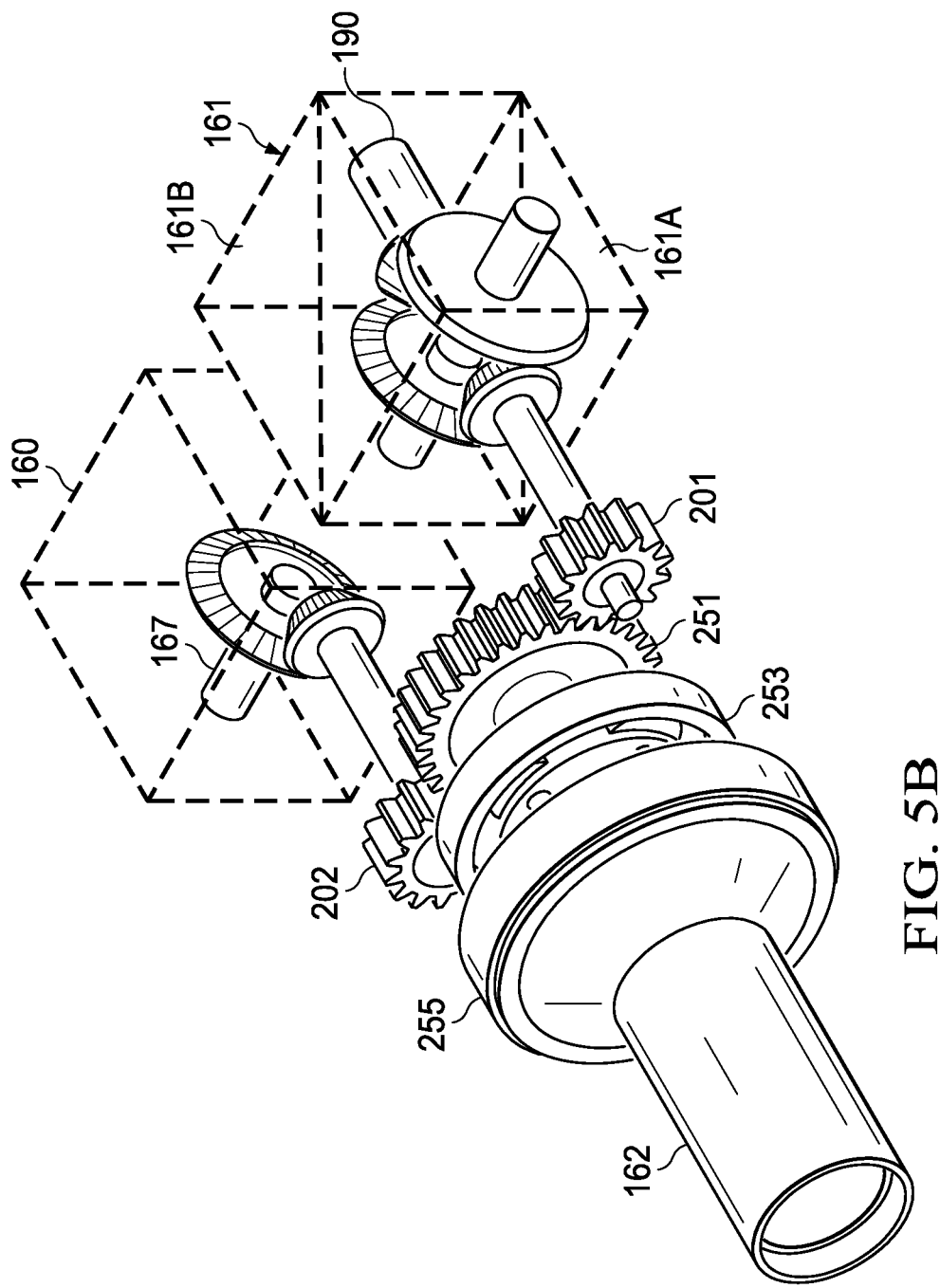
FIG. 5B is a schematic view of another gearing arrangement according to an embodiment.

As seen in FIGS. 5A and 5B, the engine 145 is coupled to the interconnect drive shaft 167 through the prop-rotor gearbox 169. The interconnect drive shaft 167 is coupled on a first end to the gearbox 160 and may be mechanically coupled to a similar gearbox on a second prop-rotor pylon. The interconnect drive shaft 167 may pass through one or more intermediate gearboxes and/or transmissions between the prop-rotor pylon 119 and a second prop-rotor pylon. In an engine out condition (e.g., an engine associated with the second prop-rotor pylon), power may be conveyed from an operable engine (e.g., engine 145), through the prop-rotor gearbox 169 to the interconnect drive shaft 167 to a prop-rotor gearbox on the second prop-rotor pylon to allow the second prop-rotor pylon to continue operating.

While illustrated in FIGS. 5A and 5B as being directly coupled to the gearbox 161, the engine 145 can be linked with the gearbox 161 via an additional input reduction gear stage using various gear reduction schemes. The interconnect drive shaft 167 may also be indirectly linked with the gearbox 160 through an optional input reduction stage.

Figure 6A:
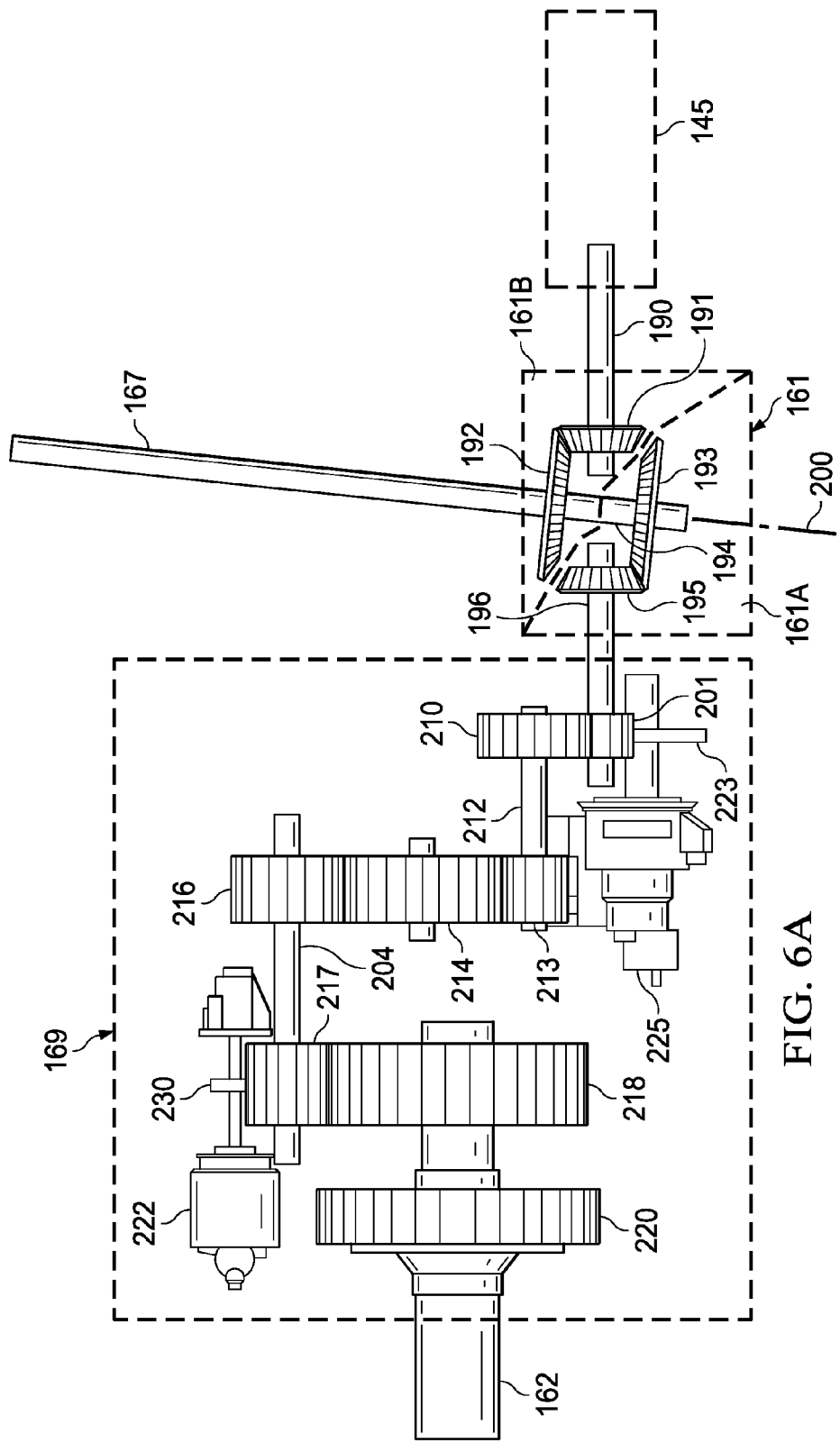
FIG. 6A is a schematic view of another gearing arrangement according to an embodiment.
Figure 6B:
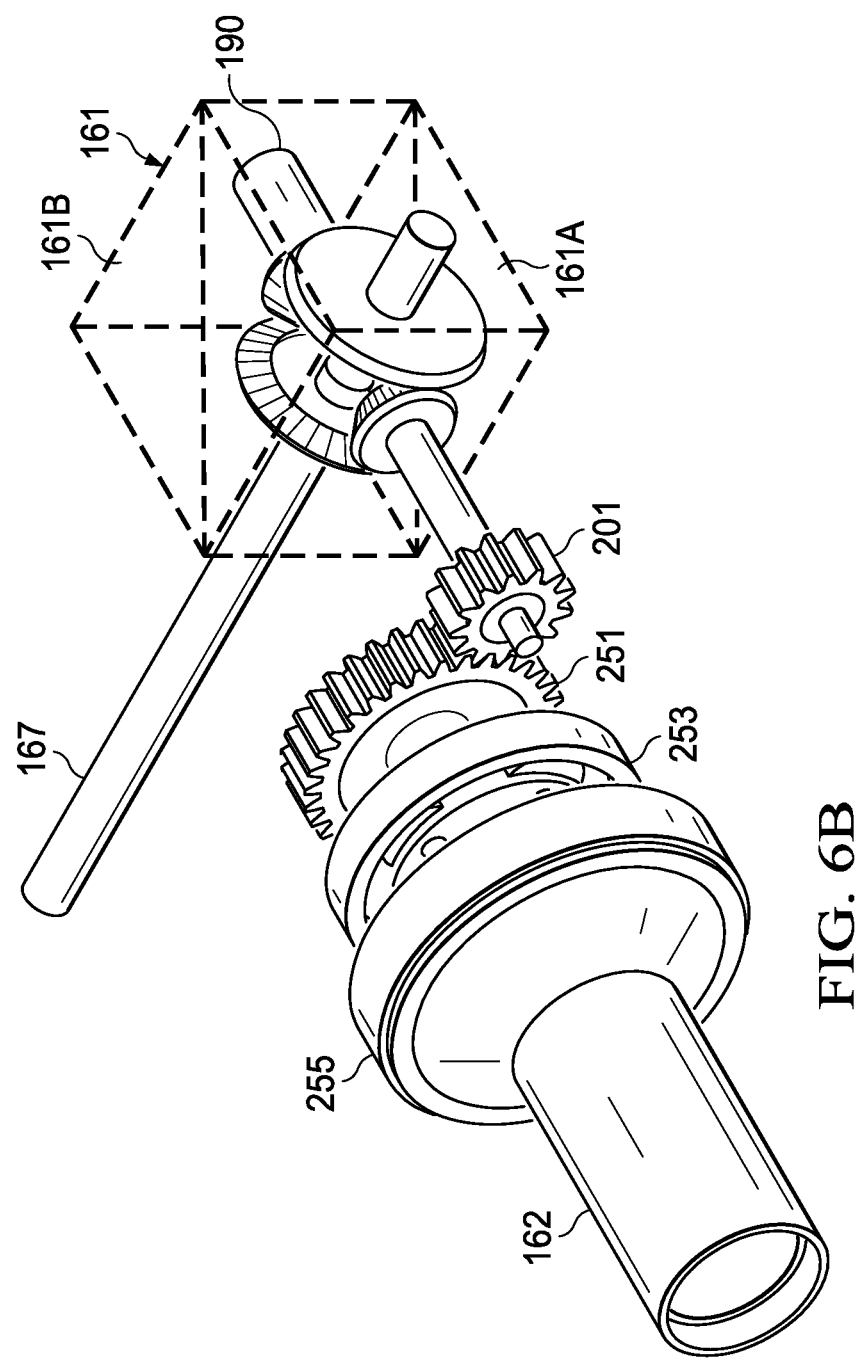
FIG. 6B is a schematic view of still another gearing arrangement according to an embodiment.

Another embodiment of a gearing configuration of the prop-rotor pylon is schematically illustrated in FIGS. 6A and 6B. The configuration of FIGS. 6A and 6B is similar to the configurations described above with respect to FIGS. 5A and 5B, and similar components will not be described in the interest of clarity. In this embodiment, the drive shaft 190 from the engine 145 passes to the gearbox 161. Within the gearbox 161, the drive shaft 190 is coupled to the conical input gear 191, which engages the conical output gear 192. The output gear 192 is coupled to the shaft 194 and the second conical input gear 193 as well as the interconnect driveshaft 167. The second input gear 193 may engage a second conical output gear 195, which may be coupled to the shaft 196. The shaft 196 may then pass to the prop-rotor gearbox 169 as described in more detail with respect to FIGS. 5A and 5B. The coupling of the drive shaft 190 with the engine 145 and the gearbox 161 in addition to the shaft 196 passing from the gearbox 161 to the prop-rotor gearbox 169 may provide a first drive path between the engine 145 and the prop-rotor gearbox 169. Further, the coupling of the interconnect drive shaft 167 with the output gear 192 may allow the interconnect drive shaft 167 to be coupled to the first drive path.

In an embodiment, the gearbox 161 can be composed of two sub-housings or sub-elements 161A, 161B that may be separate housings used to maintain a seal for lubrication. The first sub-element 161A may be configured to rotate with the prop-rotor gearbox 169, and the second sub-element 161B may be fixed with respect to the engine 145. The sub-elements 161A, 161B may allow the conical output gear 195 in sub-element 161A to rotate in an arc about the second conical input gear 193 and the conversion axis 200 while maintaining a seal to the lubricating fluid in each sub-element 161A, 161B.

The configuration illustrated in FIGS. 6A and 6B differs from the configuration of FIGS. 5A and 5B in that the interconnect drive shaft 167 is coupled to the gearbox 161, thereby eliminating the gearbox 160 and its associated components. Specifically, the elimination of the gearbox 160 allows for the conical input gear 197, the conical output gear 198, the shaft 199, and the gear 202 to be eliminated. The resulting elimination of these components would provide for a simpler gearing configuration, a reduction in weight, and a greater amount of available space within the prop-rotor pylon. Further, the coupling of the interconnect drive shaft 167 within the gearbox 161 may still provide a spiral bevel gearset having an axis of rotation aligned with the longitudinal axis of the interconnect drive shaft 167. The axis of rotation of the interconnect drive shaft 167 may align with the axis of rotation of the spindle and the axis of rotation of the shaft 194 in the gearbox 161. This alignment may allow the prop-rotor pylon to rotate about the axis of rotation of the spindle.

The configuration of prop-rotor system 108 allows the engine 145 to remain fixed on the wing member 105, while only prop-rotor pylon 119 rotates to allow aircraft 100 to fly in a helicopter mode, an airplane mode, and conversion mode. Attempts have been made in prior tilt rotor aircraft configurations to locate fixed engines within a fuselage of the aircraft; however, such a configuration requires an interconnect drive system to carry full engine power out to the wing tip mounted rotor and prop-rotor drive gearboxes, which can degrade safety and reliability of the drive system. In contrast, the rotor system 108 is configured such that the engine 145 is located in-line or directed adjacent to the prop-rotor pylon 119, so that only a short input shaft system is required to carry full engine power. The short input drive shaft system from the engine to the prop-rotor pylon can provide increased safety, reliability, and efficiency. In the illustrated embodiment, full engine power is carried in input driveshaft 190. Further, having an interconnect drive shaft configured to carry engine power between rotor systems 108 may provide a safety margin to protect against an engine failure. Furthermore, configuring rotor system 108 with a fixed engine, instead of an engine that rotates, may result in a reduction in engine certification costs, complexity, and expense, as well as providing an increase in engine options and availabilities, thus contributing to aircraft cost reduction. Still further, the use of the drive path configurations described herein may provide for independent drive path connections to the prop-rotor gearbox from the engine and the interconnect drive shaft, providing a further safety factor against a single point of failure in the prop-rotor system.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed:

1. A rotor system for tilt rotor aircraft, the rotor system comprising:

an engine disposed at a first fixed location on a wing member;

a prop-rotor pylon mechanically coupled to the engine along a first drive path, wherein the prop-rotor pylon is rotatably mounted on a spindle, wherein the prop-rotor pylon is configured to selectively rotate about a rotational axis of the spindle between a vertical position and a horizontal position;

a gearbox disposed in the first drive path, wherein the gearbox comprises a rotational shaft configured to at least partially transmit a rotation of the engine to the prop-rotor pylon, wherein a rotational axis of the rotational shaft is aligned with the rotational axis of the spindle; and an interconnect drive shaft passing through the wing member, wherein the prop-rotor pylon is mechanically coupled to the interconnect drive shaft along a second drive path, wherein a rotational axis of the interconnect drive shaft is aligned with the rotational axis of the spindle;

wherein the interconnect drive shaft is disconnected from the rotational shaft included in the gearbox causing the first drive path and the second drive path to independently engage a prop-rotor gearset.

2. The rotor system of claim 1, wherein the gearbox comprises a spiral bevel gear set.

3. The rotor system of claim 2, wherein the spiral bevel gear set is configured to selectively rotate along an axis of the spindle with the prop-rotor pylon.

4. The rotor system of claim 1, wherein the first drive path comprises an input shaft coupled to the engine and the gearbox and an output shaft coupled to the gearbox, and wherein the output shaft is configured to selectively rotate about the rotational axis of the spindle with the prop-rotor pylon between the vertical position and the horizontal position.

5. The rotor system of claim 4, wherein the input shaft is directly coupled to the engine without any intervening gears.

6. The rotor system of claim 4, wherein the first drive path further comprises at least one planetary gearset coupled to the output shaft between the gearbox and a prop-rotor.

7. The rotor system of claim 4, wherein the first drive path further comprises at least one helical gearset coupled to the output shaft between the gearbox and a prop-rotor.

8. The rotor system of claim 1, wherein the gearbox is coupled to the spindle.

9. The rotor system of claim 1, wherein the engine is disposed in-line with the prop-rotor pylon.

10. The rotor system of claim 1, wherein the engine is disposed outboard of the prop-rotor pylon.

11. The rotor system of claim 1, wherein the engine comprises an air intake, and wherein the air intake is located below the wing member.

12. The rotor system of claim 1, further comprising a conversion actuator coupled to the wing member and the prop-rotor pylon, wherein the conversion actuator is configured to selectively rotate the prop-rotor pylon between the vertical position and the horizontal position.

13. The rotor system of claim 1, wherein the gearbox is a first gearbox comprising:
a drive shaft from the engine;
a first conical input gear coupled to the drive shaft from the engine;
a first conical output gear engaging the first conical input gear and coupled to the rotational shaft;
a second conical input gear coupled to the rotational shaft;
a second conical output gear engaging the second conical input gear; and
a first output shaft coupled to the second conical input gear and coupled to the prop-rotor gearset; and
wherein the system further comprises a second gearbox mechanically coupling the interconnect drive shaft and the prop-rotor pylon in the second drive path, the second gearbox comprising:
a third conical input gear coupled to the interconnect drive shaft;
a third conical output gear engaging the third conical input gear; and
a second output shaft coupled to the third conical output gear and coupled to the prop-rotor gearset.

14. A rotor system for tilt rotor aircraft, the rotor system comprising:
an engine disposed at a first fixed location on a wing member;
an interconnect drive shaft passing through the wing member;
a prop-rotor pylon mechanically coupled to the engine along a first drive path and the interconnect drive shaft along a second drive path;
a spindle, wherein the prop-rotor pylon is rotatably mounted on the spindle, and wherein the prop-rotor pylon is configured to selectively rotate about a rotational axis of the spindle between a vertical position and a horizontal position;
a first gearbox disposed in the first drive path, wherein the first gearbox comprises a rotational shaft configured to mechanically couple the engine and the prop-rotor pylon to at least partially transmit a rotation of the engine to the prop-rotor pylon, wherein a rotational axis of the rotational shaft is aligned with the rotational axis of the spindle; and
a second gearbox disposed in the second drive path, wherein the second gearbox is configured to mechanically couple the interconnect drive shaft and the spindle to the prop-rotor pylon, and wherein a rotational axis of the interconnect drive shaft is aligned with the rotational axis of the spindle;
wherein the interconnect drive shaft is disconnected from the rotational shaft included in the first gearbox causing the first drive path and the second drive path to independently engage a prop-rotor gearset.

15. The rotor system of claim 14, wherein the first gearbox and the second gearbox each comprise spiral bevel gear sets.

16. The rotor system of claim 15, wherein each of the spiral bevel gearsets are configured to selectively rotate along an axis of the spindle with the prop-rotor pylon.

17. The rotor system of claim 14, wherein the first drive path comprises:
a first input shaft coupled to the engine and the first gearbox; and
a first output shaft coupled to the first gearbox,
wherein the second drive path comprises:
a second input shaft coupled to the interconnect drive shaft and the second gearbox; and
a second output shaft coupled to the second gearbox, and
wherein the first output shaft and the second output shaft are configured to selectively rotate about the rotational axis of the spindle with the prop-rotor pylon between the vertical position and the horizontal position.

18. The rotor system of claim 17, wherein the first output shaft and the second output shaft are mechanically coupled to at least one of a planetary gearset or a helical gearset, and wherein the at least one planetary gearset or helical gearset is coupled to a prop-rotor.

19. An aircraft comprising:
a fuselage;
a wing member;
an engine disposed at a first fixed location on the wing member;
a prop-rotor pylon mechanically coupled to the engine along a first drive path; wherein the prop-rotor pylon is configured to selectively rotate about a rotational axis between a vertical position and a horizontal position;
a first gearbox comprising a first spiral bevel gearset disposed in the first drive path, wherein the first spiral bevel gearset comprises rotational shaft configured to at least partially transmit a rotation of the engine to the prop-rotor pylon, wherein a rotational axis of the rotational shaft is aligned with the rotational axis of the prop-rotor pylon; and an interconnect drive shaft passing through the wing member, wherein the prop-rotor pylon is mechanically coupled to the interconnect drive shaft along a second drive path, wherein a rotational axis of the interconnect drive shaft is aligned with the rotational axis of the prop-rotor pylon;

wherein the interconnect drive shaft is disconnected from the rotational shaft included in the first gearbox causing the first drive path and the second drive path to independently engage a prop-rotor gearset.

20. The aircraft of claim 19, wherein the prop-rotor pylon is rotatably mounted on a spindle, and wherein the spindle is aligned with the rotational axis of the prop-rotor pylon.

21. The aircraft of claim 19, further comprising a second gearbox mechanically coupling the interconnect drive shaft and the prop-rotor pylon in the second drive path, wherein the second gearbox comprises a rotational axis aligned with the rotational axis of the prop-rotor pylon.

* * * * *